July 10, 1923.
A. B. THOMPSON
CLUTCH OPERATING DEVICE
Filed Nov. 22, 1919
1,461,256
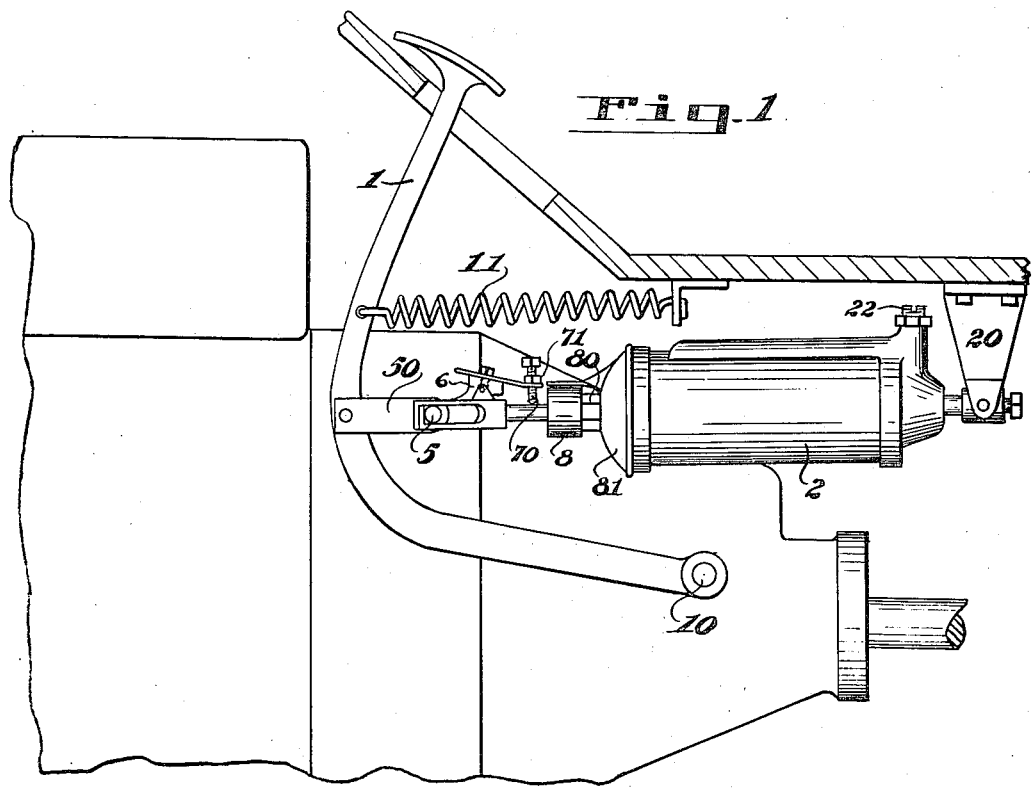
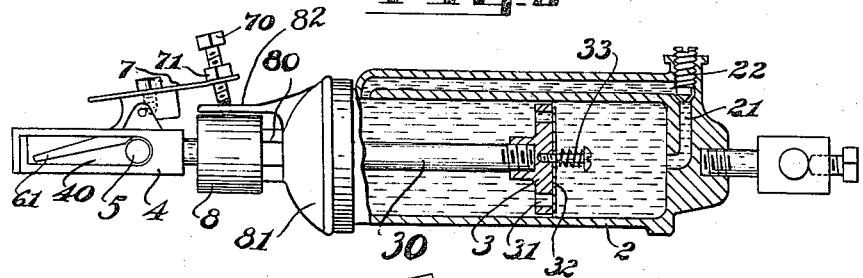
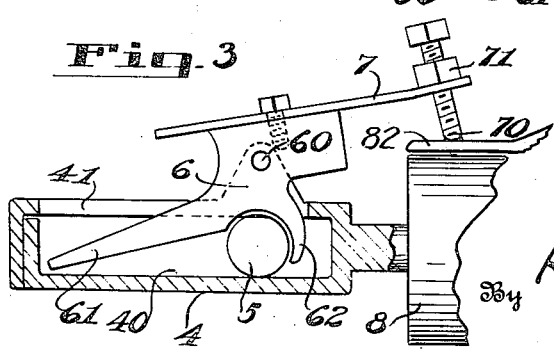
Inventor
Arthur B. Thompson.
By Henry L. & Charles L. Reynolds
Attorney Patented July 10, 1923.

1,461,256

UNITED STATES PATENT OFFICE.

ARTHUR B. THOMPSON, OF SEATTLE, WASHINGTON.

CLUTCH-OPERATING DEVICE.

Application filed November 22, 1919. Serial No. 340,042.

*To all whom it may concern:*

Be it known that I, ARTHUR B. THOMPSON, a citizen of the United States, and resident of the city of Seattle, in the county of King and State of Washington, have invented certain new and useful Improvements in Clutch-Operating Devices, of which the following is a specification.

My invention relates to devices employed for operating the clutches of automobiles or, in fact, for operating clutches of any type.

The object of my invention is to provide an attachment for the clutch and its operating mechanism whereby the application of the frictional engaging surfaces of the clutch with such suddenness as to prevent jarring will be prevented.

The features of this invention and the manner of its construction in a preferred form, will be shown in the accompanying drawings and described in the specifications.

The particular features which I believe to be new and upon which I desire patent protection will be particularly pointed out in the claims which will be attached to and terminate this specification.

Figure 1 is a side view or elevation of my device, shown as it would be applied in connection with one type of clutch operating mechanism which is employed in one type of automobile.

Figure 2 is a longitudinal section through the dashpot and the peculiar mechanism employed in connecting this to and disconnecting it from the operating mechanism.

Figure 3 is an enlarged elevation of the special mechanism connecting the clutch pedal and dashpot.

It is common practice in automobile construction to so connect the operating and controlling mechanism for the clutch, that the application of the clutch is secured by the action of a spring and the releasing of the clutch is secured by the operation of a lever.

While my invention may be applied to devices opposite in principle to this, it has been particularly designed for use in connection with a device operated in this manner. The device illustrated operates in this manner and such device will be particularly described.

The lever 1 is the lever which is used for operating or controlling the clutch. This lever is pivoted at 10. The particular mechanism for operating the clutch, aside from the lever, has not been illustrated, as this forms no part of my present invention.

The spring 11 is the spring heretofore referred to which is relied upon for returning the lever 1 and for applying the frictional engaging surfaces of the clutch.

Between the lever 1, or any other convenient part of the clutch operating mechanism, and a fixed body, as for instance, a bracket 20 which is supported by the chassis, is placed a dashpot. This dashpot device is herein shown as consisting of a cylinder 2, having therein a piston 3 and piston rod 30, which parts are provided with suitable by-passes and a controlling valve; in the construction shown the piston 3 is provided with ports 31, which are closed when the piston moves in one direction as by disk 32. Any suitable form of by-pass may be employed.

A by-pass about the piston intended for operation in the other direction, should be employed and is herein shown as consisting of a channel 21, the effective area of which is controlled, as by bolt 22, which acts as a throttle valve. Any suitable by-pass of this sort may be employed.

Piston-rod 30 has secured to its outer end a head 4, which is provided with a slot 40, in which is placed a pin 5 which is carried by, or from, the operating lever 1. As herein shown, this is carried by an armor link 50 which is secured to the lever 1.

The pin 5 is free to move in the slot 40 except as it is restrained by a locking-dog 6. This locking-dog is pivoted at 60 upon the head and has two fingers or arms, as 61 and 62, which are adapted to lie at opposite sides of the pin 5. It also has an arm which extends outwardly from its pivot, the same being illustrated as extending back towards the cylinder 2 and herein shown as including a plate 7 which may have a certain amount of resiliency. This arm carries a contact and adjusting member, which has been shown as consisting of a bolt 70. This screws within the outer end of the arm 7 and is provided with a lock-nut 71 so as to hold it in an adjusted position.

With the piston in its innermost position, the end of the bolt 70 rests upon the collar 8, which collar is threaded upon a neck 80 or upon an arm 82, either of which extends outwardly from the head of the cylinder.

The piston-rod 30 extends through this neck and the collar 8.

So long as the adjusting bolt 70 bears upon the cylinder 8, or the arm 82, the head 4 and the piston 3 which is connected therewith, must move in accordance with the pin 5 and therefore in accordance with the movement of the lever 1. When, however, the bolt 70 drops off the end of the arm 82 the action of the pin 5 upon the arm 61 of the locking-dog will throw this arm up and permit the pin 5 to move without carrying with it the head 4. At this point the piston of the dashpot is released from connection with the clutch operating parts and does not affect their movement.

The by-pass openings in the piston are of such size and the disk 32 which closes them is so placed, that the forward or outward movement of the piston is not materially interfered with and the effort required to release the clutch is not increased materially.

Upon the return of the lever 1, the same being the movement which applies a clutch, the piston 3 will have no movement until the pin 5 contacts with the arm 62 and the arm 61 has been thrown down so as to engage with the lower surfaces of the head 4. The upper wall of the head 4 is provided with a slot 41, through which project the two arms 61 and 62 of the locking-dog, thus permitting the arm 61 to extend enough outside of the head to permit free movement of the pin 5.

When the pin 5 contacts with the pin 62 upon the return movement of the lever, it will throw outward the arm 7 carrying the stop-bolt 70, to such a point that it will ride over the collar 8. During this backward movement of the piston it offers a resistance to the clutch operation of the lever and its connected parts, thus causing a slow gradual application of the engaging surfaces of the clutch and the sudden gripping action of the clutch and jerking because of such action, is prevented. In consequence, the application of the clutch will in all cases occur smoothly and without jarring, irrespective of the expertness of the handler.

The special feature of my invention is the releasing of the dashpot piston from the clutch controlling and operating mechanism for that portion of the travel which is not actually used in applying the friction surfaces. In other words, during whatever over-travel the parts may have, the dashpot is out of use. This permits a rapid return of the parts towards the position of application of the clutch, while maintaining a steady and relatively slow movement after the surfaces have been brought into contact.

What I claim as my invention is:

1. The combination with a clutch operating means, of a dashpot adapted to be connected with a transmission member of the said means, and means for disconnecting the dashpot at a definite point in the travel of the clutch members.

2. The combination with a clutch operating lever, a dashpot having a controlling connection with said lever to prevent violent application of the clutch, and means for disconnecting said dashpot and lever at a definite point in the travel of the lever.

3. The combination with clutch actuating means of a dash pot, means for automatically connecting and disconnecting the dash pot with the clutch actuating means as it passes a definite point in its movement in respectively reverse directions.

4. A clutch operating mechanism comprising a lever, a dashpot, the movable member of the dashpot having a slotted head, a pin carried by the controlling lever and entering the head, and a dog carried by said head and adapted to hold the pin at one end of said slot during the releasing movement until the clutch surfaces are freed and means for placing and holding said dog in locking position when the lever reaches the point of application of the clutch surfaces on the return movement.

5. A clutch operating mechanism comprising a lever, a dashpot, a slotted head connected with the movable member of the dashpot, a pin carried by the operating means and entering said slot, a locking dog pivoted upon said head and having two arms forming a yoke adapted to span said pin and a third arm adapted normally to engage and be restrained by a fixed surface to thereby relatively fix the pin and the yoke and adapted, at about the point of release of the clutch surfaces, to clear said fixed surface to thereby permit swinging of the dog and release of the pin.

6. The combination with a clutch operating means, a dashpot, a slotted head connected with the movable member of the dashpot, a pin carried by the operating means and entering said slot, a locking-dog pivoted upon said head and having two arms adapted to span said pin, said dog carrying an adjustable contact member, and a stop engaged by said contact member to hold the dog in pin-locking position until its movement has reached a determined point.

7. The combination with a clutch operating means, of a dashpot, a slotted head connected with the movable member of the dashpot, a pin carried by the clutch operating means and entering said slot, a locking-dog pivoted upon said head and having two arms adapted to extend across said slot and to span the said pin, said dog also having a restraining arm extending in the direction of the reciprocation of the head, and a member fixed relative to the non-varying member of the dash-pot to and engaged by said restraining arm to prevent its release until the head reaches a determined point in its movement, said member being adjustable in the direction of movement of the head to vary the time of release.

8. The combination with means for operating a clutch, of a dashpot connected to be operated by the same means, and means for disconnecting the dashpot from the clutch operating means at a definite point in the travel of the clutch members.

9. The combination with a clutch operating means, of a dashpot, a pin carried by a member of said operating means, a three-armed dog pivoted upon a movable member of the dashpot, two of said arms being adapted to span said pin to lock the dashpot to and to release it from said operating means by the swinging of the dog, and a stop carried by a non-movable member of the dashpot to restrain said dog during the period when the clutch surfaces are in engagement.

Signed at Seattle, Washington, this 15th day of November, 1919.

ARTHUR B. THOMPSON.